May 17, 1955        E. LOEWEN        2,708,413
ROTARY PISTON, POWER TRANSFERER

Filed Sept. 26, 1949        6 Sheets-Sheet 1

Inventor
E. Loewen
By J. S. Roxburgh
his atty

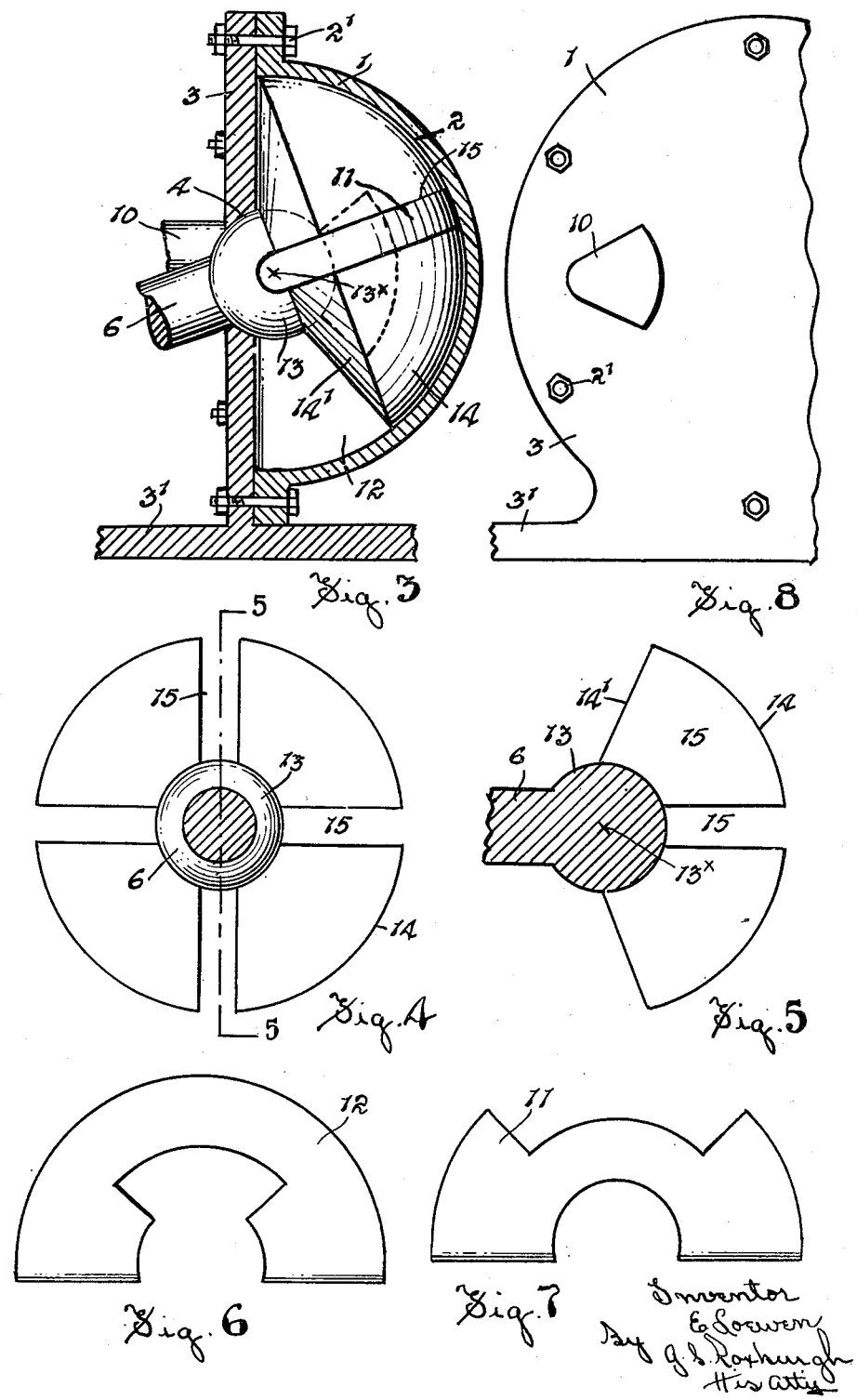

May 17, 1955

E. LOEWEN 2,708,413

ROTARY PISTON, POWER TRANSFERER

Filed Sept. 26, 1949

Inventor
E. Loewen
By G. S. Roxburgh
His Atty

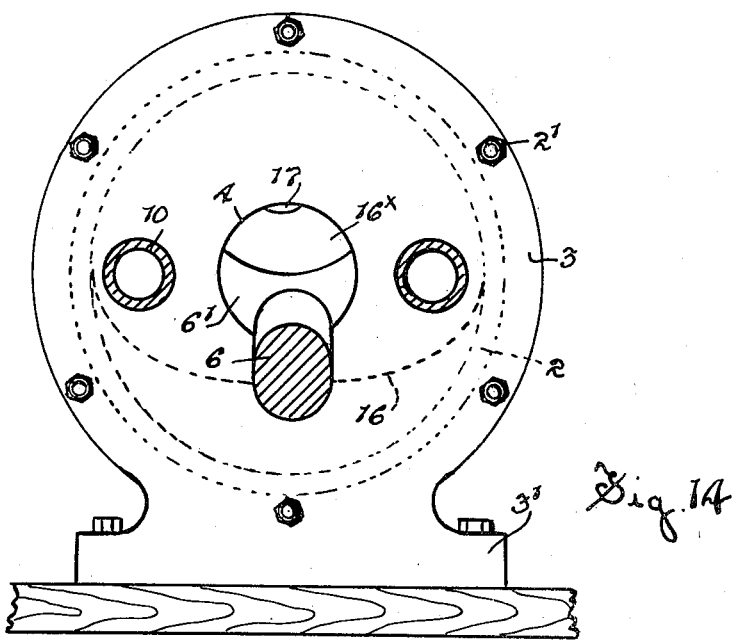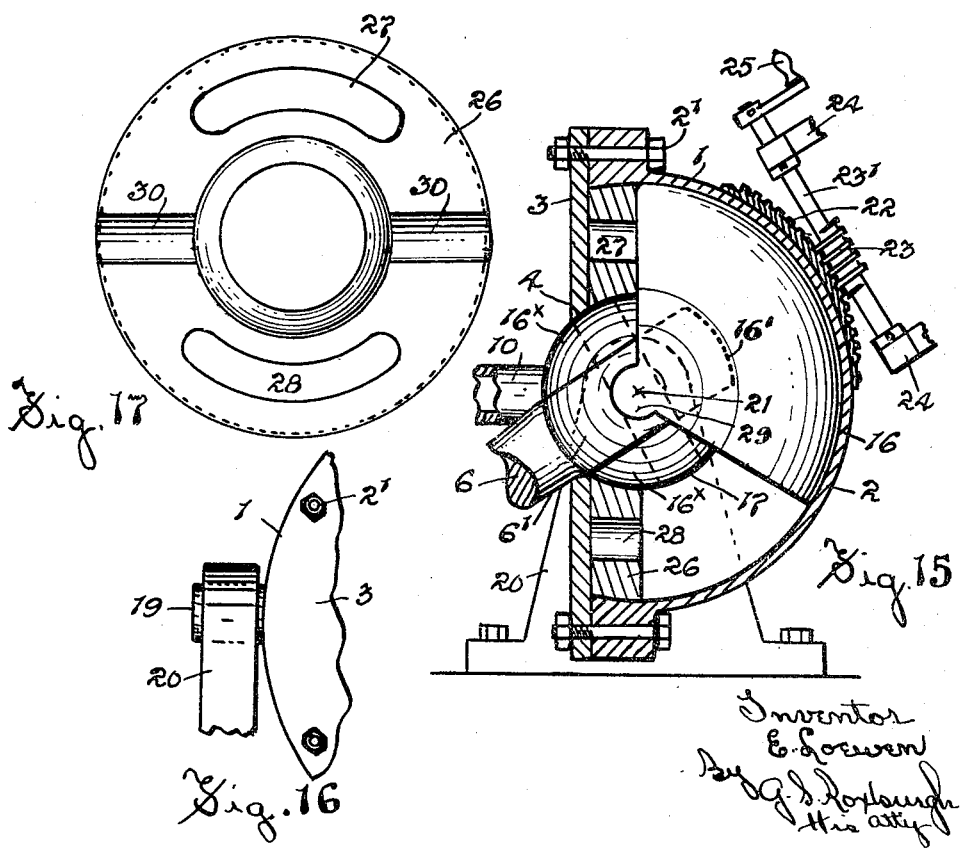

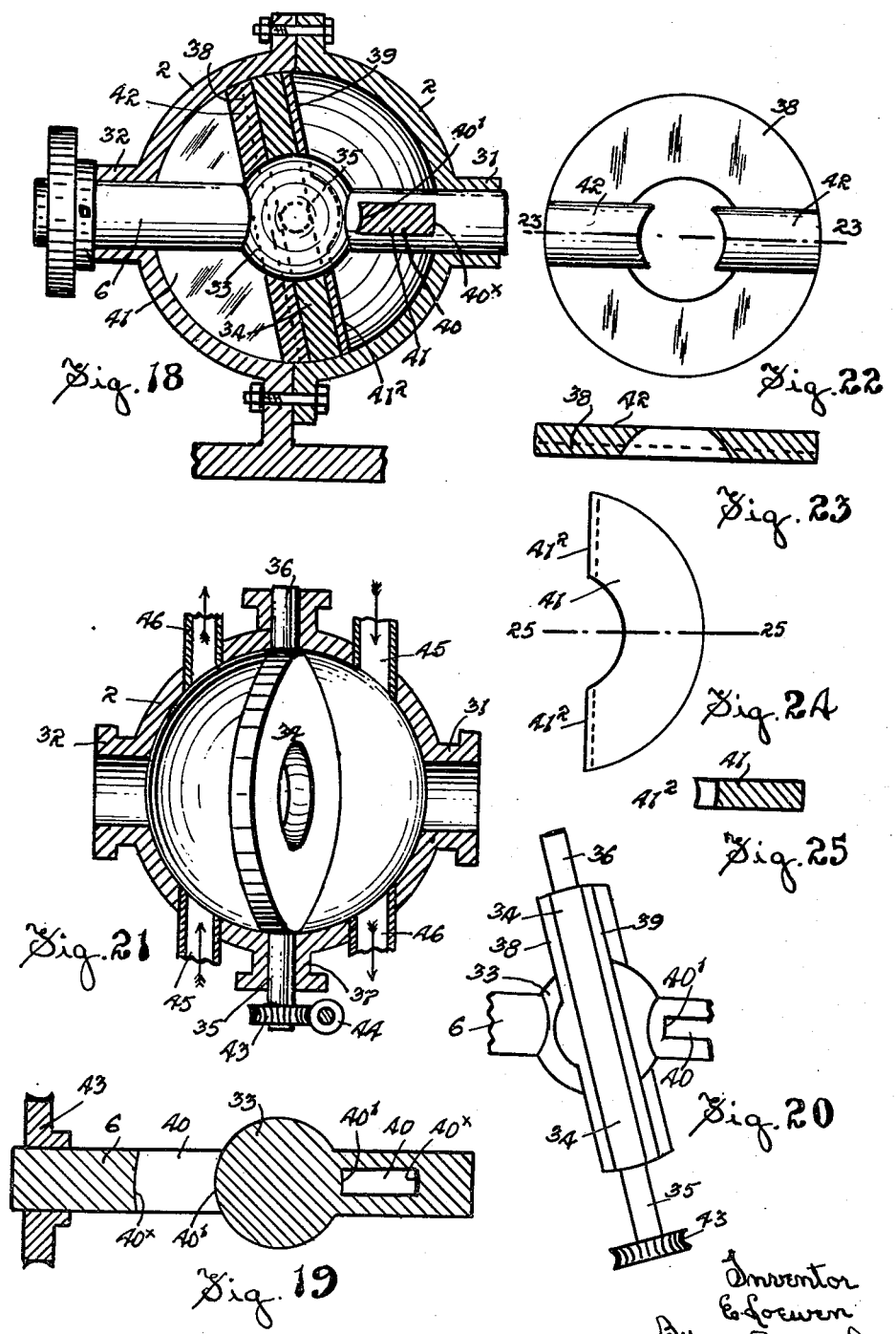

May 17, 1955          E. LOEWEN          2,708,413

ROTARY PISTON, POWER TRANSFERER

Filed Sept. 26, 1949          6 Sheets-Sheet 6

United States Patent Office
2,708,413
Patented May 17, 1955

2,708,413

ROTARY PISTON, POWER TRANSFERER

Edward Loewen, Winnipeg, Manitoba, Canada

Application September 26, 1949, Serial No. 117,909

3 Claims. (Cl. 103—117)

The invention relates to a rotary piston power transferer and an object of the invention is to provide a simple, cheap and efficient device constructed from relatively few parts and which can be used in a diversity of ways to transfer power to or from a rotary shaft.

A further object is to provide a rotary member, simulating a piston and operating in a casing, simulating a cylinder, and wherein the member divides the casing into an even number of compartments each of which gradually increases in capacity for half a revolution of the member and then gradually diminishes in capacity for the remainder of the revolution of the member.

A further object is to provide a member so confined and restricted within a casing to produce, when actuated, a compounded rotary and lateral movement of the member and to associate a rotatably mounted shaft with the member to rotate therewith.

A further object is to provide means whereby the angular position of the shaft and member can be varied in respect to the casing.

A further object is to provide a semi-spherical casing having an impeller therein, connected to an outgoing rotatably mounted shaft and with the impeller so mounted within and restricted by the casing that it has a compounded rotary and laterally shifted movement within the casing in a rotary movement of the shaft.

A further object is to provide a device which is so constructed that a number of them can be readily interconnected in multiple formation without requiring major changes in the design.

A further object is to provide a construction which permits the power of the impeller to be increased or diminished without major changes in design.

With the above major object and other minor objects in view, which will become more apparent as the description proceeds, the invention consists essentially in the arrangement and construction of parts hereinafter described, reference being had to the accompanying drawings in which:

Fig. 3 is a vertical sectional view centrally through the casing and showing a modified form of the interior parts which appear in side elevation.

Fig. 4 is an end view of the ball and the head of Fig. 3 and showing the slots for the vanes or wings, the shaft appearing in vertical section.

Fig. 5 is a sectional view at 5—5, Fig. 4.

Fig. 6 is a face view of one of the vanes shown in Fig. 3.

Fig. 7 is a face view of the other of the vanes shown in Fig. 3.

Fig. 8 is a rear view of part of the casing and showing an inlet opening.

Fig. 14 is a rear view of the casing shown in Fig. 9.

Fig. 15 is a vertical sectional view centrally through the casing and showing a further modification of interior parts together with means for rotating the casing in respect to the shaft.

Fig. 16 is a detailed side view showing one of the pivot bearings for the casing shown in Fig. 15.

Fig. 17 is a face view of the valve plate which appears in vertical section in Fig. 15.

Fig. 18 is a vertical sectional view centrally through a further modification of the invention and showing what might be called a dual arrangement of vanes or wings within a spherical casing.

Fig. 19 is a longitudinal central sectional view through the drive shaft shown in Fig. 18.

Fig. 20 is a side view of the latter shaft and showing in side elevation the parts mounted thereon.

Fig. 21 is a vertical sectional view, transversely through the sperical casing and showing the pivoted divisional plate therein and the inlets and outlets to the casing.

Fig. 22 is a face view of one of the discs which appear in vertical section in Fig. 18.

Fig. 23 is a horizontal sectional view at 23—23, Fig. 22.

Fig. 24 is a side view of one of the vanes employed in the latter modification.

Fig. 25 is a horizontal sectional view at 25—25, Fig. 24.

In the drawings like characters of reference indicate corresponding parts in the several figures.

Figure 1:
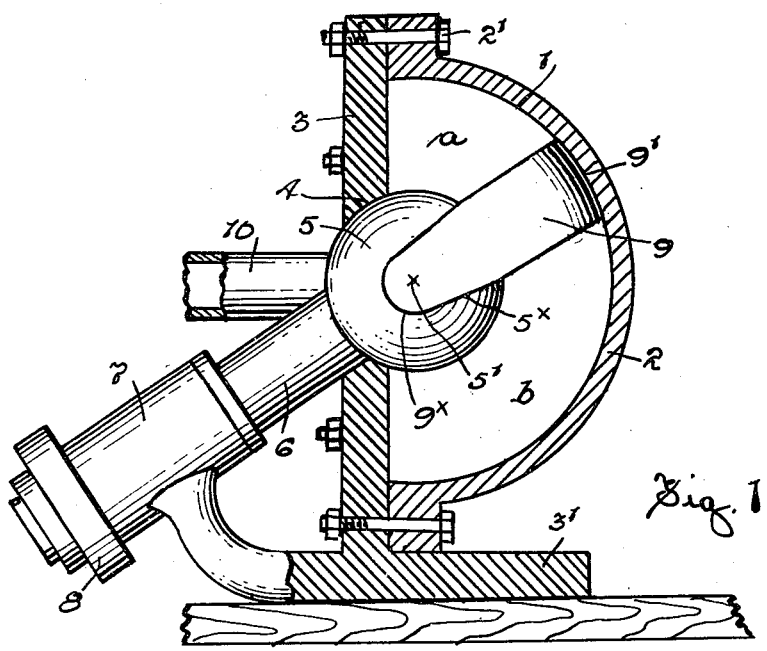
Fig. 1 is a vertical sectional view centrally through the casing of a simple form of the device and showing the contained parts and the rotary shaft in side elevation.
Figure 2:
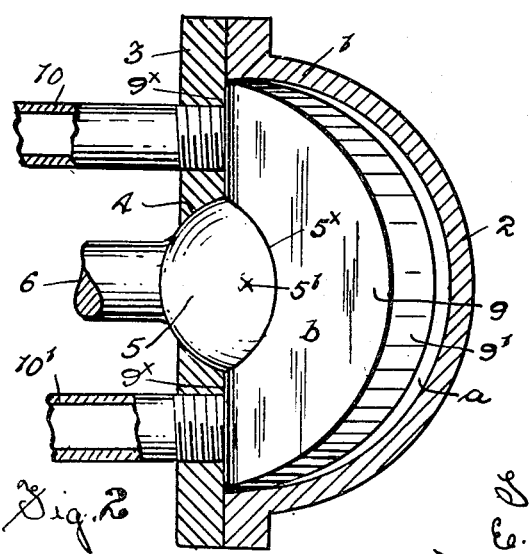
Fig. 2 is a horizontal view centrally through the casing and with the other parts appearing in plan view.

In the drawings I have shown several modifications of the invention and will first proceed to describe it in its simplest form and in such connection will refer to Figs. 1 and 2 of the drawings.

A semi-spherical casing 1 is provided which embodies a semi-spherical shell 2 secured as by bolts 2' to a closure plate 3 which plate extends upwardly from a base or stand 3' which can be permanently mounted on a suitable support. The plate 3 provides a central bearing 4 for a ball 5 the centre of which, indicated at 5', is within the casing and has the shell formed concentric thereto. The ball has an exterior shaft extending therefrom, indicated at 6, and the longitudinal axis of the shaft intersects the central point 5' of the ball. The shaft is disposed at an angle to the horizontal axis of the casing and is rotatably mounted in a bearing 7 supported by the base and is provided with a pulley 8.

The ball or head 5 is transversely slotted as indicated at 5× to receive slidably a member in the form of a semi-disc shaped wing or vane 9 which has its peripheral edge 9' contacting the inner wall of the shell and its inner edge 9× rounded concentric to the centre of the ball and such that the latter edge contacts the inner face of the closure plate. Actually the wing divides the area within the casing into two compartments $a$ and $b$ which vary in capacity as the wing is turned within the casing.

Inlet and outlet pipes 10 and 10' lead to and from the casing entering through the plate 3 and the pipe 10 can be connected to a source of fluid supply.

Assuming that the shaft 6 be rotated in a clockwise direction, the ball and wing will be rotated thereby and the wing will have a rocker movement in planes radial to the shaft and a lateral to and fro swaying movement in relation to the closure plate of the casing. In the above the rotary movement of the wing is caused by the rotated shaft and the rocker movement is caused by the pressure of the plate against the engaging inner edge of the upgoing or downgoing, moving vane. This compounded movement of the wing within the casing causes a continuous variation in the capacities of the compartments $a$ and $b$, one compartment gradually increasing in capacity as the other diminishes. On account of the latter, the fluid from the source will be drawn into the compartment which is gradually increasing in capacity and this for a half revolution of the shaft, and then that fluid will be discharged in the following half revolution due to the gradual diminishing of that compartment during the remaining half revolution of the shaft.

It will be seen that the movement of the wing is the same whether it be rotated by the shaft or it rotates the shaft.

It will be noticed that in the above form of the device, the angular position of the shaft is fixed in relation to the casing so that at a given speed of rotation the rate of displacement of the fluid is constant.

I will now refer to and describe the modification of the invention as shown in Figs. 3 to 8 inclusive, and wherein two wings or vanes 11 and 12 operate within the casing, the wings being ninety degrees apart and rotatable with the angularly disposed shaft 6 and mounted each for alternate sliding movement within the shell and around the ball and in directions at right angles to the longitudinal axis of the shaft. The shaft is rotatably mounted in the same manner as in Fig. 1 and has the ball 13 rotatable in the bearing 4 of the closure plate and with the central point 13× within the casing and being also the central point of the shell. Within the casing the ball merges into the frusto-conical base 14' of a semi-spherical head 14 which engages the interior wall of the shell 2. The head is transversely slotted as indicated at 15 to slidably receive the vanes or wings 11 and 12 and as the vanes intersect one another at right angles and have end movement, they are formed as shown in Figs. 6 and 7 to permit them to end shift within the slots and around the ball without interfering one with the other. Each vane crosses the shell and contacts the shell closure plate and the ball, so that what might be called the ends of the vanes or those parts projecting at any time from the head and ball divide the open area within the shell into four compartments each of which in the rotation of the shaft varies in capacity from maximum to minimum. As each compartment successively opens to the inlet pipe and subsequently enlarges, fluid is drawn into the compartment to its maximum capacity and the entered fluid is then discharged through the outlet pipe from that compartment as it contracts.

The latter type of the device is similar to the single vane type in that the angular position of the shaft is shown as fixed in relation to the fixed casing.

While I have shown two vanes in the latter views, it will be obvious that their number could be increased without departing from the spirit of the invention.

I now refer to the Figs. 9 to 14 inclusive of the drawings where a further modification of the invention is shown. In these views the casing, the angularly disposed shaft and the bearing are the same as shown in Fig. 1. Within the casing I locate a head or plunger 16 in the form of a segment of a sphere which contacts with the inner wall of the casing and partially fills the latter. The inner end of the shaft terminates in a flat faced cross head 6' which partially enters a pocket 16' formed in the head 16 and is pivotally secured to the head 16 by a pivot pin 17 passing centrally through the cross head 6' and having its ends pivotally mounted in opposing lugs 16× formed as part of the head 16. The cross head 6' is circular in horizontal cross section and the pocket is made complementary to the portion of the cross head entering the same and the lugs and pin ends are rounded so that the assembled parts form a ball corresponding to that previously mentioned and pivotally mounted in the closure plate of the casing and having its centre point 18 within the casing and to which the casing is concentric. It will be seen that in the structure so provided the head 16 is forced to turn with the angularly positioned shaft and that its pivotal mounting on the pin allows it to sway to accommodate such movement. By the movement so provided the head or plunger 16 operating within the casing provides interior compartments, one of which in the rotation of the shaft is gradually increasing in capacity and the other of which is gradually decreasing in capacity. The inlet and outlet pipes are positioned so that the fluid is drawn into a compartment as it expands and discharged from that compartment as it contracts.

In the structures already described there is no provision made for varying the annular position of the shaft in relation to the casing closure plate in order to vary the output. Such an arrangement is shown in Figs. 15 to 17 inclusive of the drawings and the structure is very similar to that appearing in Figs. 9 to 13 as comparison will show. The shaft is mounted in a fixed bearing such as is shown in Fig. 1 and the casing instead of being fixed as appearing in the prior described views, is a pivoted casing. Actually the casing is supplied at its sides with horizontally aligned stub axles 19 (see Fig. 16) which are pivotally mounted in similar side standards 20 and the axles are arranged such that the casing, if rotated, will turn around a horizontal axis passing through the centre of the ball and indicated at 21 in Fig. 15. Any suitable means can be employed for rotating the casing, such being herein shown as a rack 22 secured to the casing shell and engaged by a worm 23 carried by a worm shaft 23'. Stationary bearings 24 support the worm shaft and a crank 25 is supplied for rotating the worm shaft. Further in this last mentioned modification, a disc like plate 26 is introduced adjacent the closure plate and moves with the head 16 and is supplied with elongated ports 27 and 28 concentric to the ball and adapted to sweep past the inlet and outlet ports or pipes which latter in this instance will be flexible to accommodate any rotary movement of the casing. It will be observed that the head 16 is supplied with lugs 29 at the sides of the ball, curved concentric to the centre point 21 and which are adapted to ride in curved complementary slots 30 formed in the front face of the plate 26.

It is possible to utilize the stype of device shown in what might be called a tandem arrangement and with or without a variable output. Such an arrangement is shown in Figs. 18 to 25 inclusive. In one form of this construction the casing is spherical, being made from two semi-spherical shells which are interconnected and permanently mounted, and the said casing is supplied with central horizontally aligned bearings 31 and 32 which receive the horizontal shaft 6 supplied centrally with a ball 33 whose central point is that of the casing. A central disc like divisional plate 34 rotatably receives the ball and has its peripheral edge slidably contacting the inner wall of the casing and said plate is supplied with horizontally aligned pivot pins 35 and 36 positioned at right angles to the shaft and pivotally received in similar bearings 37 provided at the sides of the casing. At opposite sides of the divisional plate I place similar discs 38 and 39 which ride the ball and have their peripheral edges slidably contacting the inner wall of the casing. The shaft 6 within the casing and at opposite sides of the ball, is supplied with similar cross slots 40 positioned ninety degrees apart and having their inner end walls 40' of the same radius as the ball and their outer end walls 40× of the same radius as the spherical casing.

The above slots receive slidably, similar arcuate vanes or wings 41 whose inner and outer edges ride the ball and the inner wall of the casing respectively. The ends of the wings, indicated at 41² are rounded as shown and ride similar radially disposed ribs 42 provided on the adjacent faces of the discs 38 and 39. The wings divide the interior of the casing into four compartments which vary in capacity as the shaft rotates. Provision is made for canting the divisional plate to various angular positions in respect to the shaft 6, such being herein shown as a worm wheel 43 secured to one of the divisional plate pivot pins and engaged by a worm 44 which latter can be rotated as desired in the same manner as the worm shown in Fig. 15. In the latter modification the casing will be supplied with two inlet and two outlet ports or pipes 45 and 46 respectively and as shown in Fig. 21.

It will be obvious that if the divisional plate be maintained in a fixed canted position within the casing, the output will remain constant and that by providing means for canting the plate, such as shown, one can vary the output as desired over a given range from maximum to minimum depending upon the canting travel it is possible to give the plate.

Figure 9:
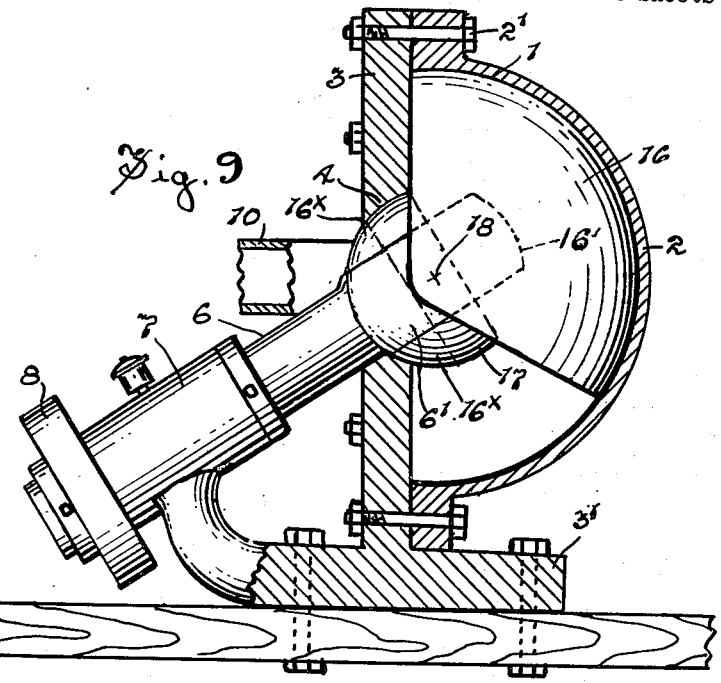
Fig. 9 is a vertical sectional view centrally through the casing and showing a further modification of interior parts.
Figure 10:
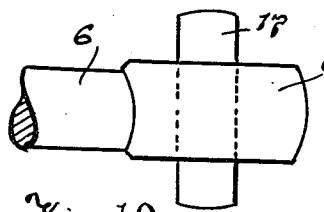
Fig. 10 is a side view of the drive shaft head and its pin and as used in the latter modification.
Figure 11:
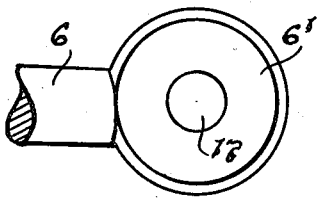
Fig. 11 is a plan view of the parts shown in Fig. 10.
Figure 12:
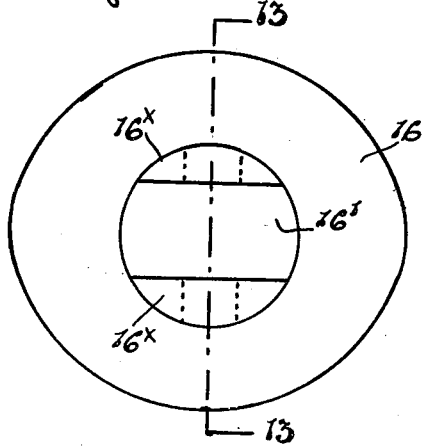
Fig. 12 is a rear view of the head shown in Fig. 9.
Figure 13:
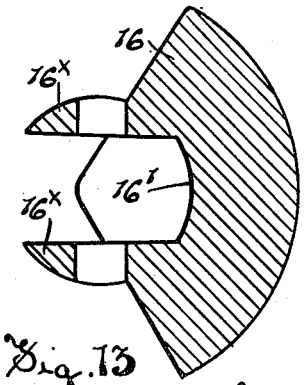
Fig. 13 is a vertical sectional view at 13—13, Fig. 12.
Figure 26:
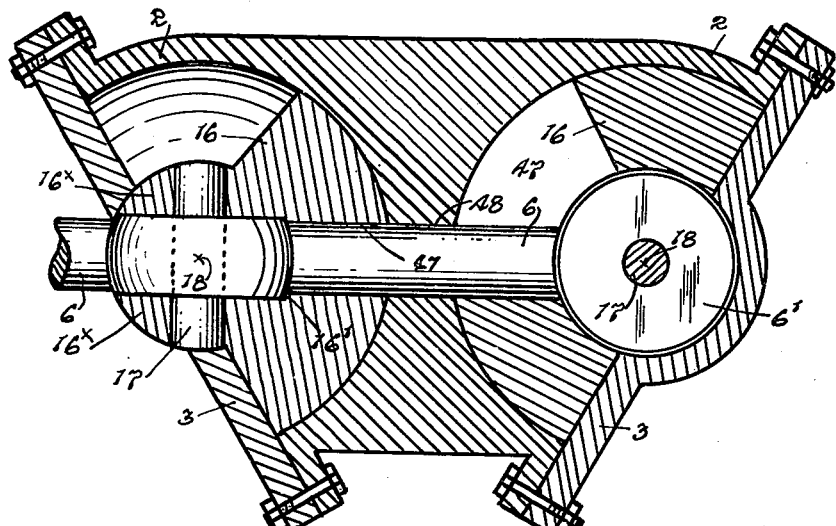
Fig. 26 is a vertical sectional view centrally through a further modification of the invention and showing what might be termed a tandem arrangement of the structure appearing in Fig. 9 a single casing housing the moving parts.
Figure 27:
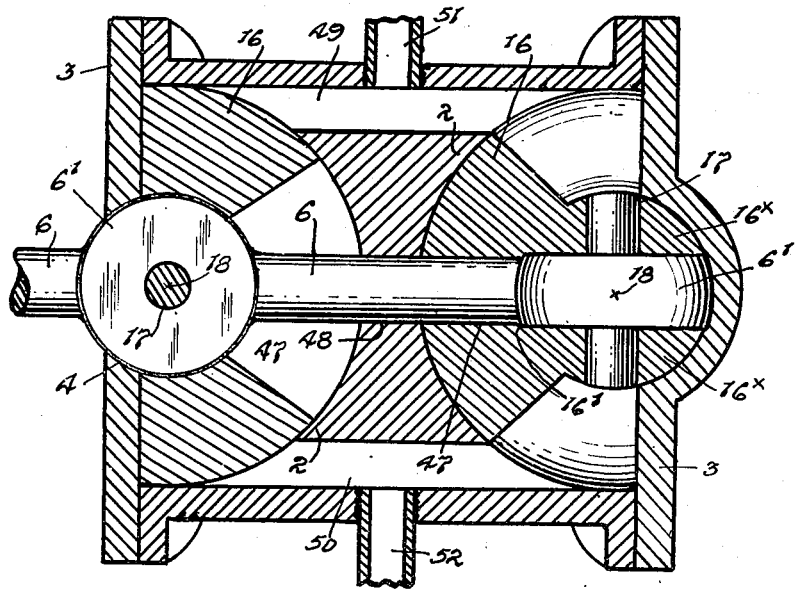
Fig. 27 is a horizontal sectional view centrally through the device shown in Fig. 26.

A further modification of the invention is shown in Figs. 26 and 27 where a plurality of the devices as shown for the greater part in Figs. 9 to 13 are interconnected by the common extended shaft 6. In views 26 and 27 the shaft is shown as horizontal and the two integrally formed semi-spherical casings 2 are disposed at an angle to the shaft and the heads 16, both conforming to that shown in Fig. 9, are connected each to the shaft in the same manner as shown in Figs. 9 to 13. In order that the extended shaft may interconnect the heads 16 each head is slotted as indicated at 47 and the casing is bored at 48 to receive the shaft. It will be observed that the pins 17 connecting the shaft to the heads are located ninety degrees apart as are also the slots 47 and that the slots are of sufficient length to permit of the required sway movement of the heads when the shaft is rotated or they are rotated within the shell.

The above casing is bored to provide two internal ducts 49 and 50 opening at their ends to the interiors of the casings and positioned as shown in Fig. 27. Pipes 51 and 52 lead from the ducts. In this tandem arrangement each head operates in its casing in the manner already described but one is ninety degrees ahead of the other. Obviously the dual arrangement could be readily extended.

It will be noted that in all the various modifications of the invention, the movement of the member when actuated, is a rocker movement in planes radial to the longitudinal axis of the shaft and a lateral swaying movement, to and fro, in relation to the closure plate or divisional member of the casing. Actually the member is caused to take the compounded movement on account of the angular position of the closure plate in respect to the entering shaft which carries and rotates the member and the shell serves to enclose the several compartments and confine the member.

The member simulates a piston and the casing simulates a cylinder and the compounded movement of the member brought about by the structure provided transfers power from the shaft to the member or the reverse, depending upon which is actuated.

What I claim as my invention is:

1. In combination, a segmental, spherical shell, a plate closing the open side of the shell, a spherical ball rotatably mounted in the plate and having its central point within the shell and the shell concentric to such point, said shell, ball and plate confining a positive displacement, working chamber, a rotatably mounted drive shaft extending radially from the ball and with its longitudinal axis intersecting the axis of the plate and a shiftable member rotatable with the ball and continuously dividing the working chamber into separate compartments and inlet and outlet ports to and from the compartments.

2. In combination, a segmental, spherical shell, a plate closing the open side of the shell and confining an interior, positive displacement chamber, a rotatably mounted driving shaft, a part spherical member dividing the chamber into separate compartments, a ball joint rotatably carried by the plate and connecting the shaft to the member and having the centre of the ball joint within the chamber and positioned at the centre of the shell, said shaft having the longitudinal axis thereof intersecting the axis of the plate at the centre of the ball joint and inlet and outlet ports to and from the compartments.

3. In combination, a segmental, spherical shell, a plate closing the open side of the shell, and confining an interior, positive displacement chamber, a rotatably mounted driving shaft, a part spherical member dividing the chamber into separate closed compartments, a hinged ball joint rotatably carried by the plate and connecting the member rockably to the shaft and having the centre of the ball joint within the chamber and positioned at the centre of the shell, said shaft having its longitudinal axis intersecting the axis of the plate at the centre of the ball joint and inlet and outlet ports to and from the compartments.

References Cited in the file of this patent

UNITED STATES PATENTS

| | | |
|---|---|---|
| 82,833 | Hersey | Oct. 6, 1868 |
| 263,573 | Patten | Aug. 29, 1882 |
| 1,226,864 | Cyphers et al. | May 22, 1917 |
| 1,612,287 | Holmes | Dec. 28, 1926 |
| 1,678,050 | Kearney | July 24, 1928 |
| 1,890,612 | Kempthorne | Dec. 13, 1932 |
| 1,965,976 | Kempthorne | July 10, 1934 |
| 2,016,605 | Kempthorne | Oct. 8, 1935 |
| 2,040,178 | Kempthorne | May 12, 1936 |
| 2,049,775 | Holmes | Aug. 4, 1936 |
| 2,087,772 | Kempthorne | July 20, 1937 |
| 2,204,760 | Jensen | June 18, 1940 |
| 2,211,417 | Granberg | Aug. 13, 1940 |